2,887,445
PRODUCTION OF POLYETHYLENE

John D. Calfee, Dayton, and Lowell E. Erbaugh, Vandalia, Ohio, assignors to Monsanto Chemical Company, St. Louis, Mo., a corporation of Delaware No Drawing. Application January 20, 1954
Serial No. 405,242

14 Claims. (Cl. 204—162)

This invention relates to the polymerization of ethylene and products obtained thereby. In one embodiment the invention pertains to the modification of the polymerization of ethylene under the influence of gamma-radiation so as to prevent the formation of unprocessable cross-linked polyethylene products.

Polymers of ethylene are of great commercial importance. The normally solid thermoplastic polymers melting above about 110° C. and having a molecular weight of from 6,000 up to 20,000 or higher, and showing the presence of a crystalline phase by X-ray diffraction, is known commercially as polyethylene, and is used in the form of films, filaments and articles made by injection and compression molding. Lower molecular weight ethylene polymers of the nature of semi-solid to solid waxes also find uses such as in coatings and polishes.

It has recently been found that ethylene can be polymerized under the influence of ionizing radiation, preferably electro-magnetic radiation of high frequency not deflected by electric or magnetic fields and of great penetrative value, e.g., gamma-rays and X-rays. The preferred form of radiation is gamma-radiation obtained from radioactive materials, e.g., cobalt-60. Such polymerizations carried out at high pressures give a very high efficiency of utilization of the energy of the gamma- or other ionizing radiation, avoids the necessity of adding extraneous catalytic materials, and has various other benefits. For more details reference is made to the copending application in which one of us is a joint inventor, viz., U.S. application Serial No. 318,098, filed October 31, 1952.

Polyethylene made by polymerization under the influence of gamma-radiation at pressures of 5,000 pounds per square inch and higher tends to be cross-linked and non-processable. This is particularly true of polymer made at about 30,000 pounds per square inch and 25 to 250° C. or higher. This is usually a disadvantage for most uses to which ethylene polymer may be put. However, in accordance with the present invention, we have found that aromatic hydrocarbons and chlorinated aromatic hydrocarbons modify the polymerization so as to permit formation of processable material. Although benzene and toluene have a slight effect and are therefore within the scope of the invention in its broadest aspects, the compounds especially preferred for this purpose are the aromatic hydrocarbons containing at least one lower alkyl group and having at least two carbon atoms in the alkyl portion of the molecule. Xylene, being readily available, and particularly effective, is a preferred material to use. By way of example of the effects obtainable in practicing the invention, at 30,000 pounds per square inch pressure, 100° C., and under the influence of gamma-radiation from cobalt-60, by effecting the polymerization in the presence of fairly large quantities of benzene, very strong and tough polyethylene metarial can be made. At the same conditions, using xylene but in much smaller proportions, stiff, high-melting polyethylene can be prepared. It is possible to employ polymerization conditions for polymerizing ethylene in the presence of ionizing radiation that give a high molecular weight polymer so cross-linked that it cannot be processed at all, by which is meant that it cannot be subjected to the conventional operations such as milling on hot mill rolls or injection molding. However, by effecting the polymerization at the same conditions with the exception that an aromatic or chlorinated aromatic hydrocarbon is present in the reaction mixture in suitable amounts, a product can be made which is processable. The characteristics of the product will be greatly dependent upon the particular aromatic or chlorinated aromatic hydrocarbon chosen, upon its amount, and upon the reaction conditions. Thus, by use of large amounts of the preferred class of aromatic hydrocarbons, i.e., those containing at least one lower alkyl group and having at least two carbon atoms in the alkyl portion of the molecule, polyethylene having a lower molecular weight than the conventional thermoplastic polyethylene material, and having the nature of wax, can be made; however, such wax is much harder than the usual polyethylene waxes. Benzene is not sufficiently active to cause formation of waxes, even when used in large quantities. Our products, especially if made at temperatures below about 125° C., are of higher density and greater crystallinity than those made at the same conditions without the presence of the added aromatic or chlorinated aromatic hydrocarbon.

The preferred form of radiation is gamma-radiation obtained from radioactive materials. One very convenient form is cobalt-60, which can be readily obtained by subjecting ordinary cobalt-59 metal to irradiation in an atomic pile. Cobalt-60 has a half-life of 5.3 years, and emits gamma-radiation of 1.33 and 1.17 m.e.v. (million electron volts). Another example of a suitable and convenient source of gamma-radiation for carrying out the present invention is tantalum-182, having a half-life of 117 days, and gammas of 1.22, 1.13, 0.22 and 0.15 m.e.v. Tantalum-182 of course provides a high specific gamma flux but its short half-life is a disadvantage requiring re-irradiation in the pile every few months. Numerous other gamma-emitting radio-isotopes available from chain reacting piles and cyclotrons can also be used. Other materials providing gamma-radiation are available as naturally occurring materials, e.g., potassium-40, bismuth-214, protactinium-234, thallium-208, and lead-211. Choice of a particular source of gamma-radiation will depend upon availability, expense, intensity and the convenience of handling. A 1-curie source of cobalt-60 was used by us in obtaining the particular data set forth hereinbelow, and proved to be sufficiently intense to give excellent results. We have used sources having intensity as low as 50 millicuries with success. Sources having intensities from below 50 millicuries up to, for example, 10 kilocuries, can be conveniently handled with proper facilities. Green fuel elements from an atomic pile make a convenient source of gamma-radiation; green fuel elements are made up of the initial radio-active material charged to the atomic pile, e.g., uranium-235, having associated therewith the various products of radioactive decay, and such elements are highly radioactive and are normally stored for a considerable length of time before chemical processing is attempted. The radiation energy being emitted during such time is normally wasted, and can be used to advantage in the present invention. The ethylene polymerizations of the present invention can, if desired, be effected in an atomic pile, the location in the pile of course being selected to give the desired type and intensity of radiation.

Of course, all necessary safety precautions must be used in handling radioactive material or in utilizing any source of radiation to carry out the process of this invention. Suitable techniques are now well-known and readily available.

A less preferred but suitable source of radiation for use in accordance with this invention is an X-ray generator. However, the mechanical problems of subjecting monomers under high pressure to the action of X-rays are in most instances more difficult than those encountered with radioactive substances.

While we consider that the employment of α-radiation and β-radiation are within the purview of our invention in its broadest aspects, they are presently considered to be much less preferred than gamma- or X-ray radiation. Thus, broadly stated our invention involves the use of aromatic and chlorinated aromatic hydrocarbons in the high pressure polymerization of ethylene under the influence of ionizing radiation, which however is preferably electro-magnetic radiation of high frequency not deflected by electric or magnetic fields and of great penetrative value, e.g., gamma-rays and X-rays.

It is preferred that the pressure be at least 1,000 pounds per square inch, and for most purposes it is preferably at least 20,000 pounds per square inch. With radiation intensities sufficiently great, the temperature chosen will be somewhat related to the pressure and radiation intensity and to the type of polymer desired. Usually a temperature of 75° C. to 150° C. is satisfactory, although much higher temperatures say up to 250° C. or somewhat higher are permissible. With sufficiently intense sources of radiation, the temperature can be as low as room temperature, i.e., 20° C. and even much lower, such as just below or far below the critical temperature of ethylene (9.6° C.). In any event sufficient pressure is employed to maintain the ethylene at the particular temperature in the liquid phase at temperatures below the critical temperature or in the so-called "dense phase" at temperatures above the critical temperature. All other conditions being equal, lowering of polymerization temperature tends to increase the molecular weight of the polyethylene product. The addition of aromatic or chlorinated aromatic hydrocarbons in accordance with the present invention, especially with polymerization temperatures below 125° C., serves not only to decrease the molecular weight but also to minimize branching and cross-linking, thus resulting in a more highly crystalline but yet processable product.

The reaction time is another of the inter-dependent variables. The reaction time will range from a few minutes to a number of days, depending upon the other reaction conditions. Also, in general shorter reaction times, to obtain a given conversion, are used for a continuous flow process than for a batch process. While the data given hereinafter were obtained in batch-type pressure reactors, it is to be understood that the invention can also be effected by continuous flow methods, wherein the ethylene undergoing polymerization is subjected to the action of the ionizing radiation during part or all of its flow through the reaction zone. It is thus convenient to surround a source of radioactive material with polymerizing ethylene mixture flowing in one or more reaction tubes.

It is unnecessary to add any extraneous material to the reaction mixture for the purpose of catalyzing the polymerization. However, in its broadest aspects the present invention does not exclude the presence of catalytic materials either deliberately or fortuitously in the reaction mixture. Thus, a catalyst, for example oxygen, may accelerate the reaction being effected by the process of the invention which however can be carried out in the absence of oxygen or any other catalytic material. By simple mechanical means the intensity of radiation in the reaction zone is readily controlled at all times and can be decreased or increased as the course of polymerization may require, or can be removed altogether. Another serious problem encountered in high pressure ethylene polymerizations heretofore has been the action of trace impurities in the ethylene monomer which inhibits the polymerization to a marked extent. The use of ionizing radiation strongly reduces the effect of such trace impurities.

Pressures of from 20,000 to 40,000 pounds per square inch are conveniently used, but if desired even much higher pressure, for example 200,000 pounds per square inch and higher, is permissible, limited only by the strength of the equipment.

It is not outside the broad scope of the invention to effect interpolymerization of ethylene with one more other unsaturated monomers copolymerizable therewith, for example, vinyl chloride, vinylidine chlorofluoride, vinyl acetate, alkyl acrylates such as methyl acrylate, and alkyl methacrylates such as methyl methacrylate. Usually the quantity of such comonomer will be in the range of 5 to 25 weight percent based on the total weight of ethylene plus comonomer.

The invention in its broadest aspects contemplates the employment of any aromatic hydrocarbon or halogenated aromatic hydrocarbon, which latter class of compounds is typified by the chlorinated aromatic hydrocarbons. Although the brominated, fluorinated, etc. aromatic hydrocarbons can be used, they are usually more expensive and much less preferred than the corresponding chlorinated hydrocarbons to which they are generally equivalent for the purposes of this invention. The aromatic and chlorinted aromatic hydrocarbons in question have one or more aromatic nuclei, e.g., are compounds belonging to the benzene, naphthalene, anthracene, diphenyl, or terphenyl series. Those containing one or more lower alkyl group, i.e., alkyl group containing not over 6 to 8 carbon atoms, substituted on a benzene nucleus, and having at least two carbon atoms in the alkyl portion of the molecule, are preferred. Also included in the preferred compounds are those containing at least one lower cycloalkyl group, e.g., a cycloalkyl group containing not over 8 to 10 carbon atoms, substituted on a benzene nucleus. The aralykyl, e.g., benzyl, and the cycloalkylalkyl, e.g., cyclohexylethyl groups, are considered the equivalents of the alkyl and cycloalkyl groups for the purposes of this invention. Any of the aromatic hydrocarbons of the type described can be halogenated on the aromatic nucleus or nuclei, and/or much less preferably on the substituent group, i.e., on the alkyl, cycloalkyl, aralkyl, etc. group. By way of example of suitable compounds are mentioned: benzene, monochlorobenzene, dichlorobenzene, toluene, parachlorotoluene, xylene (ortho, meta and/or para), xylenes mono-chlorinated in the ring, xylenes mono-chlorinated on a methyl group such as o-chloromethyltoluene, cumene, cymene, mesitylene, cyclohexylbenzene, (cyclohexylmethyl) benzene, methylcyclopentyl benzene, tert-dodecyl benzene, tert-butylisopropylbenzene, naphthalene, α-methylnaphthalene, biphenyl, bis-(p-ethyl)biphenyl, anthracene, the various terphenyls, 9,10-dichloroanthracene, ethylbenzene, tert-butylbenzene, 1,3-diphenylpropane, 1,1-diphenylpropane. Because of ease in separating the polyethylene product, normally liquid compounds of the type described are preferred over solid compounds such as anthracene. It will be appreciated that the various aromatic and chlorinated aromatic hydrocarbons will not be the full equivalents of each other in their actions in the present invention. Although all give some benefits, certain types of compounds are preferred, as indicated above. With a given weight of aromatic compound, one will often have a greater modifying effect than another. Thus, for example, on a weight-for-weight basis, the action of xylene is much greater than the action of benzene and/or toluene and therefore xylene is much preferred over benzene or toluene. Also, of course, nature and extent of the action of a given aromatic or chlorinated aromatic hydrocarbon will be dependent upon the conditions at which the polymerization is effected.

For the foregoing reasons, it will be understood that the quantity of a particular aromatic or halogenated aromatic hydrocarbon to be used will be chosen in accordance with the other reaction variables. In general the quantity will range from 1 to 60 parts by weight aromatic or chlorinated aromatic hydrocarbon per 100 parts of the combined weight of the ethylene plus the said aromatic or chlorinated aromatic hydrocarbon, although in particular instances quantities lower or greater than these amounts can be used. It will be found to be the general rule that the larger the quantity of a chosen aromatic or chlorinated aromatic hydrocarbon used at fixed reaction conditions, the lower the molecular weight of the resulting polyethylene product. For example, using 35 parts xylene with 65 parts ethylene at 30,000 pounds per square inch pressure and 100° C. gives a product which is a hard wax. This wax is much harder than the ordinary commercial polyethylene waxes, and is insoluble in hot benzene as opposed to the complete solubility in hot benzene of said commercial polyethylene waxes. As the quantity of xylene is decreased in polymerizations carried out at otherwise the same conditions, the molecular weight of the product progressively increases. At otherwise the same conditions, 10 parts xylene to 90 parts ethylene appears to give about the best thermoplastic polyethylene for use in conventional molding equipment. Lowering the proportion of xylene further, results in a polyethylene product which is more difficult to process, and when the xylene is omitted entirely the product is completely unprocessable. The density of all these materials made at 100° C. in the presence of xylene is about 0.935 gram per cubic centimeter. This is in contrast to the density of commercial polyethylene which is approximately 0.917 gram per cubic centimeter. This higher density indicates a greater crystallinity, and is very desirable in giving stiffness to the polyethylene product while still retaining a sufficiently low molecular weight and lack of cross-linking and branching to permit easy processing. On the other hand, if the reaction temperature is raised to the neighborhood of 150 to 175° C., the density of the product is not nearly so great, and is usually in the range of 0.91 to 0.92 gram per cubic centimeter. However, the advantages of the use of xylene or other aromatic or halogenated aromatic hydrocarbon are still present in that the product is easily processable and has properties similar to those of commercial polyethylene molding material. If the xylene is omitted, however, the product is hard, cross-linked, and unprocessable.

The following examples provide information on various combinations of materials and reaction conditions and resulting products coming within the scope of the present invention. It will be appreciated of course that variations from the particular details and combinations thereof that are given in the examples can be made without departing from the invention in its broadest aspects.

EXAMPLE 1

In obtaining the data reported hereinafter the following apparatus was used. The reactor was an electrically heated stainless steel bomb of 200 cc. capacity which was capable of withstanding a working pressure of 40,000 pounds per square inch. The bomb was fitted with an 5/16 inch inside diameter well, made of high pressure tubing, which passed through the center of the bottom closure and extended into the middle of the reaction space. The purpose of the well was to permit the cobalt-60 to be surrounded by materials being subjected to gamma-radiation. The cobalt-60 was in the form of a thin wire encased in a 5" capsule which could be run in or out of the reactor well by remote control. The cobalt-60 employed was a 1-curie source. A lead shield was employed around the cobalt-60 when not in use. Constant temperature was maintained with a conventional controller and pressure was measured and followed by an automatic recorder. A high pressure pump provided monomer at any desired pressure up to 40,000 pounds per square inch. The aromatic hydrocarbon chosen for a particular test was first charged into the bomb which had previously been evacuated, after which the ethylene was pressured into the reactor. The reactor contained a 3/32" stainless steel feed tube which extended to the bottom of the reaction vessel.

In order to keep the number of variables at a minimum, and study only the effects of the aromatic hydrocarbon on the polymerization, a series of tests was performed in which the temperature was 100° C., the reaction time was 20 hours (except where it was felt that this was not long enough to obtain adequate polymer for evaluation), and the pressure was maintained at 30,000 pounds per square inch.

The results of this series of tests are reported in Table I. The varying proportions of xylene employed are stated as weight percent xylene based on total weight of the charge.

*Table I*

GAMMA POLYMERIZATION OF ETHYLENE AT 30,000 P.S.I. AND 100° C. IN PRESENCE OF XYLENE

| Run | Pressure (p.s.i.) | Xylene (Wt. Percent) | Time (hrs.) | Product Weight (grams) | Tensile Properties | | | Comments |
|---|---|---|---|---|---|---|---|---|
| | | | | | Strength (p.s.i.) | | Elong. (Percent) | |
| | | | | | Yield | Failure | | |
| Control | 30,000 | 0 | 3¾ | 17 | | | | Too grainy and cross-linked to process; could not make test specimens. |
| A | 30,000 (H₂O press, no dip tube). | 40 (+ 50 ml. water). | 39½ | 25 | Hard wax | | | |
| B | 30,000 (dip tube) | 40 | 21 | 17 | Hard wax, like A | | | Use of dip tube helped to get better mixing. |
| C | 30,000 (dip tube) plugged | 20 | 20½ | 19 | Very hard wax | | | |
| D | 30,000 (dip tube) | 10 | 19½ | 29 | 2,466 | 2,252 | 537 | Good material, had high gloss, did not stick to plates in molding. |
| E | 30,000 (dip tube) plugged | 5 | 20 | 45 | 2,161 | 2,538 | 298 | Had high gloss, tough. |
| F | 30,000 to 8,000 | 40 | 65 | ca. 20 | | | | Hard wax.[1] |
| G | 30,000 | 10 | 16 | 35 | 2,500 | 3,510 | 815 | Similar to D. |

[1] Hardness (Rockwell, R-scale, 60 kg.) = 54; a widely used commercial polyethylene wax has value of 85 and hence is much softer.

Runs A and B were made to ascertain the effect of water on the polymer. In the first case no feed tube was used but the reaction mixture was shaken before exposure to the cobalt-60 source. In the second case, the dip tube was used. Earlier tests had shown that thorough admixture of ethylene with xylene is important in obtaining beneficial effects of the xylene. The products from both runs A and B were essentially the same;

they were hard waxes which melted at 116–120° C. and were readily soluble in hot xylene.

radiation was derived from the same 1-curie cobalt-60 source. Data are summarized in Table II.

Table II
GAMMA POLYMERIZATION OF ETHYLENE AT 30,000 P.S.I. AND 100° C. IN PRESENCE OF AROMATIC HYDROCARBONS

| Run | Charge | | Time (Hrs.) | Conversion (percent) | Tensile Properties | | Remarks |
| --- | --- | --- | --- | --- | --- | --- | --- |
| | Material | grams | | | Strength (p.s.i.) | Elongation (percent) | |
| H | Ethylene<br>Benzene | 60<br>60 | 39½ | 25 | 3,650 (failure) | 230 | Product a wax. |
| I | Ethylene<br>Xylene | 80.5<br>34.5 | 41 | 30 | | | |
| J | Ethylene<br>Xylene | 100<br>4.4 | 17 | 41 | 2,430 (yield) | 275 | |
| K | Ethylene<br>Xylene | 100<br>1.8 | 17½ | 60 | 2,100 (failure) | 160 | |

The series was continued with decreasing quantities of xylene in runs C, D and E. Some mechanical difficulties were encountered here due to plugging of the dip tube and therefore the actual pressure in the reaction zone is not known with certainty. However, the runs form a series which show the changes resulting from changes in the quantity of xylene. The product of run C (20% xylene) was a very hard wax which melted at 117° C. and was soluble in hot xylene but insoluble in boiling benzene. Run D (10% xylene) gave a higher molecular weight polyethylene which showed excellent physical properties. The tensile strength of the material was about 2,500 p.s.i. (yield) with an elongation of over 500 percent. The molded product had a high gloss and was more rigid than regular polyethylene, a property much to be desired for some applications. The product of run E (5% xylene) had a tensile strength of about 2,200 p.s.i. with an elongation of about 300 percent and seemed to be slightly cross-linked. Under the conditions used, the product resulting from the use of 10 percent xylene was optimum for properties desirable in polyethylene employed for molding purposes. The runs with the large percentage of xylene were best for the production of hard waxes.

In run F a second pressure recorder was placed in the system to determine the pressure in the reaction zone. The dip tube became badly plugged after 4 hours and the pressure dropped to 8,000 p.s.i. at the end of 65 hours. The product was a wax, which was much harder than the usual commercially sold polyethylene wax. Run G was made with a larger dip tube to avoid plugging. Product made in this run had excellent physical properties, including a tensile yield strength of 2,500 p.s.i. and tensile strength at failure of about 3,500 p.s.i., together with an elongation of over 800 percent.

EXAMPLE 2

In the apparatus described in Example 1, tests were made employing either benzene or xylene. The gamma-radiation was derived from the same 1-curie cobalt-60 source. Data are summarized in Table II.

The material made with 50% benzene (H) had a tensile strength of 3650 and an elongation of 230%. It dissolved slowly in hot xylene, indicating little cross-linking and high molecular weight. The rate of formation was low. With 30% xylene (run I) instead of 50% benzene a wax resulted. Thus, xylene has a far more pronounced effect on the polymerization. Two additional xylene runs with 4% (J) and 2% (K) xylene were made which yielded polyethylenes of tensile strength 2430 and 2100 p.s.i. and elongations of 275 and 160%, respectively. Both materials were non-cross-linked, being soluble in hot xylene. The rate of conversion was lower for the 4% xylene run than for the 2% xylene run.

EXAMPLE 3

In the apparatus and by the procedures described in Example 1, tests were made employing xylene but at higher temperatures than those set forth in the preceding examples. The gamma-radiation was derived from the same 1-curie cobalt-60 source. Data are summarized in Table III.

Table III
GAMMA POLYMERIZATION OF ETHYLENE AT 30,000 P.S.I. IN PRESENCE OF XYLENE

| Run | Temp. (° C.) | Xylene (Percent) | Time (Hrs.) | Product (grams) | Tensile Properties | | | | Density | Comments |
| --- | --- | --- | --- | --- | --- | --- | --- | --- | --- | --- |
| | | | | | Strength (p.s.i.) | | Elong. (Percent) | | | |
| | | | | | Yield | Failure | Yield | Failure | | |
| L | 150 | 10 | 18½ | 100 | 1,405 | 1,655 | 27 | 480 | .919 | |
| M | 175 | 10 | 6 | 83 | 1,435 | 2,045 | 50 | 490 | .919 | Product from upper section of bomb sample. |
| | | | | | 905 | 1,340 | 60 | 560 | .907 | Product from lower section of bomb sample. |
| N | 150 | 40 | 18 | 100 | | | | | | Tough wax. |

The data in Table III show the production of polyethylene products having properties differing considerably from those made at 100° C. and reported in the earlier examples. The materials were not so crystalline as shown by the lower density and were therefore not as stiff. The tensile strength and elongation were lower, and the properties are in the general range of commercial polyethylene molding materials. Here again, it will be noted that by the use of comparatively large quantities of xylene, i.e., 40 percent, the molecular weight was sufficiently lowered to produce a tough wax rather than a moldable material. In the absence of xylene at the same conditions, the product is too cross-linked and hard to process and test specimens cannot be made.

EXAMPLE 4

Ethylene was copolymerized with 1-chloro-1-fluoroethylene (vinylidene chlorofluoride) in the presence of benzene. The reaction conditions were 30,000 p.s.i., 100° C., 40 hours, 1-curie cobalt-60 source. The reactor was the same one employed in Examples 1 and 2, and was charged with 33 grams benzene, 18 grams vinylidene chlorofluoride, and 72 grams ethylene.

The copolymer obtained had a tensile strength (at failure) of 1240 p.s.i. and a tensile elongation of 615%. It was soluble in hot benzene.

While the invention has been described herein with particular reference to various preferred embodiments thereof, it will be appreciated that variations from the details given herein can be effected without departing from the invention in its broadest aspects.

We claim:

1. The process comprising polymerizing while under the influence of high-energy ionizing radiation a reaction mixture consisting essentially of a polymerizable material and a compound selected from the class consisting of aromatic and chlorinated aromatic hydrocarbons in sufficient amount to prevent the formation of an unprocessable cross-linked polymer, said polymerizable material being selected from the class consisting of ethylene and ethylene plus at least one other unsaturated monomer copolymerizable therewith, to produce a normally-solid polymer product.

2. The process of claim 1 carried out in the presence of water.

3. In the gamma-radiation induced polymerization of a reaction mixture consisting essentially of a polymerizable material selected from the class consisting of ethylene and ethylene plus at least one other unsaturated monomer copolymerizable therewith, the improvement which comprises effecting said polymerization in the presence of sufficient xylene to prevent the formation of an unprocessable cross-linked polymer.

4. The process of claim 3 carried out in the presence of water.

5. In the high-energy ionizing radiation induced polymerization of a reaction mixture consisting essentially of a polymerizable material selected from the class consisting of ethylene and ethylene plus at least one other unsaturated monomer copolymerizable therewith, the improvement which comprises effecting said polymerization in the presence of a compound selected from the class consisting of (a) aromatic hydrocarbons containing at least one lower alkyl group and having at least two carbon atoms in the alkyl portion of the molecule, (b) aromatic hydrocarbons containing at least one lower cycloalkyl group, and (c) chlorinated aromatic hydrocarbons of the class defined in (a) and (b), in sufficient amount to prevent the formation of an unprocessable cross-linked polymer, to produce a normally-solid polymer product.

6. A process comprising polymerizing under the influence of high-energy ionizing radiation a reaction mixture consisting essentially of a polymerizable material and a sufficient amount to prevent the formation of an unprocessable cross-linked polymer of an aromatic hydrocarbon containing at least one lower alkyl group and having at least two carbon atoms in the alkyl portion of the molecule, said polymerizable material being selected from the class consisting of ethylene and ethylene plus at least one other unsaturated monomer copolymerizable therewith, to produce a normally-solid polymer product.

7. The process of claim 6 wherein said aromatic hydrocarbon is xylene.

8. The process of claim 6 wherein said aromatic hydrocarbon is cumene.

9. The process of claim 6 wherein said polymerizable material is ethylene.

10. The process of claim 6 wherein ethylene is interpolymerized with a lesser quantity of an unsaturated monomer copolymerizable therewith.

11. The process of claim 10 wherein said monomer is vinylidene chlorofluoride.

12. The process of claim 10 wherein said monomer is vinyl acetate.

13. The process comprising subjecting reactants consisting essentially of ethylene in admixture with from 5 to 35 parts by weight xylene per 100 parts ethylene, to polymerization under the action of gamma-radiation of polymerizing intensity and at a pressure in the neighborhood of 30,000 pounds per square inch and at a temperature in the neighborhood of 100° C., to produce a normally-solid polymer product.

14. A process comprising subjecting reactants consisting essentially of ethylene in admixture with sufficient of an aromatic hydrocarbon containing at least one lower alkyl group and having at least two carbon atoms in the alkyl portion of the molecule to prevent the formation of an unprocessable cross-linked polyethylene, to polymerization under the action of gamma-radiation of polymerizing intensity from a radioactive material at a pressure of at least 5,000 pounds per square inch, and at a temperature within the range of 75 to 200° C., to produce a normally-solid polymer product.

References Cited in the file of this patent

UNITED STATES PATENTS

| 1,961,493 | Hillis | June 5, 1934 |
| 2,350,330 | Remy | June 6, 1944 |

FOREIGN PATENTS

| 511,718 | Belgium | Nov. 28, 1952 |

OTHER REFERENCES

Chapiro: Comptes Rendus, vol. 228 (1948), pp. 1490–1492.